United States Patent
Heide et al.

(10) Patent No.: US 7,589,665 B2
(45) Date of Patent: Sep. 15, 2009

(54) MULTISTATIC METHOD AND DEVICE FOR RADAR MEASURING A CLOSE DISTANCE

(75) Inventors: Patric Heide, Vaterstetten (DE); Martin Vossiek, Hildesheim (DE)

(73) Assignee: Siemens Aktiengesellschaft, Munich (DE)

(*) Notice: Subject to any disclaimer, the term of this patent is extended or adjusted under 35 U.S.C. 154(b) by 154 days.

(21) Appl. No.: 10/531,983

(22) PCT Filed: Oct. 31, 2003

(86) PCT No.: PCT/EP03/12188

§ 371 (c)(1),
(2), (4) Date: Mar. 15, 2006

(87) PCT Pub. No.: WO2004/042419

PCT Pub. Date: May 21, 2004

(65) Prior Publication Data

US 2006/0197701 A1 Sep. 7, 2006

(30) Foreign Application Priority Data

Nov. 8, 2002 (DE) .................. 102 52 091

(51) Int. Cl.
*G01S 13/10* (2006.01)
*G01S 13/40* (2006.01)
*G01S 7/28* (2006.01)
*G01S 7/40* (2006.01)
*G01S 13/00* (2006.01)

(52) U.S. Cl. ............ 342/127; 342/59; 342/118; 342/134; 342/135; 342/165; 342/173; 342/174; 342/175; 342/195

(58) Field of Classification Search .......... 342/21, 342/22, 59, 118, 123–128, 130–145, 165–175, 342/195, 26 R, 104–110, 385–391, 450, 463–465, 342/192–197
See application file for complete search history.

(56) References Cited

U.S. PATENT DOCUMENTS

| 3,117,317 A | 1/1964 | Kenyon |
| 4,132,991 A | 1/1979 | Wocher et al. |
| 4,521,778 A | 6/1985 | Knepper |
| 4,994,809 A * | 2/1991 | Yung et al. .................. 342/108 |
| 5,471,211 A | 11/1995 | Randall et al. |
| 5,510,800 A * | 4/1996 | McEwan .................... 342/387 |
| 5,818,371 A | 10/1998 | Lu et al. |

(Continued)

FOREIGN PATENT DOCUMENTS

| DE | 38 24 163 | | 1/1990 |
| GB | 2249685 A | * | 5/1992 |
| GB | 2 251 149 | | 6/1992 |

OTHER PUBLICATIONS

Vossiek, M., Magori, V., Ermert, H. "An Ultrasonic Sensor System for Location Gauging and Recognition of Small Workpieces"; Sensor 95.7 Internat. Fachmesse mit Kongress fur Sensoren, Messaufnehmer u. Systeme.

*Primary Examiner*—Bernarr E Gregory
(74) *Attorney, Agent, or Firm*—Young & Thompson

(57) ABSTRACT

A multistatic detection device for measuring a distance to an object includes a transmitter and a receiver, each having a high-frequency oscillator and a pulse generator. The pulse generators can be supplied with synchronisation signals emitted by signals generators, the synchronisation signals being transmitted by a data bus common to the transmitter and the receiver. The relation of the deterministic phases of high-frequency signals can be produced by the high-frequency oscillator. The method includes feeding two synchronisation signals to the transmitter and the receiver by the common data bus, the transmitter signal is transmitted towards an object, the signal passing through the receiver and contained in the data bus being mixed with a reception signal reflected by the object, thereby producing a measuring signal thereby making it possible to compare the phases of clock signals.

16 Claims, 3 Drawing Sheets

U.S. PATENT DOCUMENTS

| | | |
|---|---|---|
| 6,278,400 B1 | 8/2001 | Cassen et al. |
| 6,456,229 B2 * | 9/2002 | Wurman et al. ............... 342/59 |
| 6,462,699 B2 * | 10/2002 | Wurman et al. ............... 342/59 |
| 6,466,168 B1 * | 10/2002 | McEwan .................... 342/465 |
| 6,590,520 B1 * | 7/2003 | Steele et al. .............. 342/26 R |
| 2002/0075178 A1 | 6/2002 | Woodington et al. |

* cited by examiner

MULTISTATIC METHOD AND DEVICE FOR RADAR MEASURING A CLOSE DISTANCE

FIELD OF THE INVENTION

The invention relates to a method and an arrangement for multistatic close-range radar measurements.

BACKGROUND OF THE INVENTION

There are a wide range of methods and arrangements for setting up and operating pulse radar sensors, known for a long time from [1], [2] and [3] inter alia. Pulse radar sensors are used as fill level sensors in industrial metering technology, parking aids or close-range sensors in motor vehicles to prevent collision, to map surroundings and for the navigation of autonomous vehicles and transport systems, e.g. robots and conveyor units. Generally pulse radar sensors operate in the areas of application listed at center frequencies of approximately 1 GHz to 100 GHz with typical pulse lengths of 200 ps to 2 ns. Such sensors have been referred to for some time as ultrawideband (UWB) radar due to their large measurable bandwidth. Almost all pulse radar sensors have in common the fact that their measurement signals have such a large bandwidth that the signals cannot be received directly and processed using standard technologies. Therefore almost all known systems use so-called sequential sampling systems. With the sequential sampling principle, which is known from former digital sampling oscilloscopes, the measurement signal is sampled sequentially over a plurality of measurement cycles by displacing the sampling times sequentially.

Solutions for pulse radar using circuit technology are for example known from the above-mentioned prior art. The prior art describes a transmit pulse with a defined repetition frequency CLK-Tx (Clock Transmission), which is transmitted and the reflected receive signal is sampled with a sampling system with a repetition frequency CLK-Rx (Clock Reception). If the frequencies of the transmit sequence differ slightly from those of the sampling sequence, the phases of the two sequences move slowly towards each other. This slow relative displacement of the sampling time towards the transmit time brings about a sequential sampling process.

FIG. 1 shows a known embodiment of a pulse radar operating in the manner described above. In a transmit unit a transmit clock generator $A^T$ generates a clock frequency CLK-Tx, with which a pulse generator $B^T$ generates short voltage pulses cyclically. A high-frequency oscillator $C^T$ is then activated with these short pulses and generates high-frequency oscillations during the activation period, which are transmitted as transmit signals $D^T$ via the antenna $E^T$. An identical pulse generator chain is set up in a receive branch or in a receive unit with the corresponding elements $A^R$, $B^R$ and $C^R$. The pulse signal from the oscillator $C^R$ is passed to a mixer M, which therefore also functions as the sampling system, as the mixer is also supplied with the receive signal $D^R$ from the other side. The signal elements of the transmit signal D of the transmit branch reflected off an object O and returned to the receive antenna $E^R$ as a receive signal $D^R$ are mixed by the mixer M with the signal from $C^R$ of a low-frequency base band. The sampling pulse sequence thus generated is smoothed by a bandpass filter BPF and thus ultimately produces the measurement signal LFS (generally Low Frequency Signal).

To achieve a good signal to noise ratio (SNR) of the measurement signal it is crucial that the oscillators $C^T$ and $C^R$ have a deterministic, i.e. not a stochastic, phase relationship to each other over all the pulses in a sequence. Such a deterministic relationship of the pulses generated by $C^T$ and $C^R$ is not simply achieved, as $C^T$ and $C^R$ operate independently of each other. A deterministic relationship results however when the pulse signals activating pulse generators $B^T$ and $B^R$ are such that they generate harmonic waves, which are in the frequency band of the high-frequency oscillators $C^T$ and $C^R$. The harmonic waves cause the oscillators $C^T$ and $C^R$ not to oscillate stochastically on activation but to be activated coherently in respect of the harmonic waves of the signals $B^T$ and $B^R$. As the signals and harmonic waves from the pulse generators $B^T$ and $B^R$ are always the same with each activation process, $C^T$ and $C^R$ respectively always oscillate with a characteristic fixed initial phase, so that their signals have a deterministic phase and time relationship to each other, predetermined by the transmit signal sequence and the sampling signal sequence.

Methods for ensuring the deterministic relationship of the transmit and sampling pulses are known from the prior art, in which a single continuously operating fixed-frequency oscillator is generally used, from which the required pulses are derived using switches. It is also known that a common antenna can be used for transmitting and receiving instead of separate antennae such as $E^T$ and $E^R$, the transmit and receive signals being separated for example by means of a route matrix switch.

However in many applications it is preferable not only for distances to be measured one-dimensionally using a radar sensor but also for there to be the option of mapping object scenarios in a multi-dimensional manner. For three-dimensional scenario mapping for example and thereby accurate determination of distance from the object, the sensors and/or their measurement directions are either moved and measurements are taken one after the other at different sites or in different directions and/or systems are used with a plurality of spatially distributed sensors. Such systems are for example known from [4] as "multistatic sensor systems". With multistatic sensor systems with a plurality of spatially distributed transmitters and receivers it is advantageous if one of the transmitters respectively transmits a signal, which is reflected off the object scenario and then detected by all the receivers. Such arrangements and their mode of operation however have the disadvantage that a large outlay is generally required to couple spatially distributed transmit and receive branches such that the phases of their high-frequency signal sources have a deterministic relationship to each other.

As described above, a deterministic phase relationship is a basic precondition for achieving a good signal to noise ratio. Deriving high-frequency signals from a common source and distributing them spatially by means of high-frequency lines is however disadvantageous for commercial applications in particular, as very high costs are incurred and signal attenuation and dispersion of the transmitted signals result. Phase control circuits for coupling a plurality of oscillators are generally excluded for similar reasons.

SUMMARY OF THE INVENTION

The object of the present invention is therefore to specify a low-cost, multistatic arrangement and a method, by means of which precise distance measurement can be achieved.

The multistatic sensor arrangement for measuring distance from an object has a transmit unit (Tn) and a receive unit (Rm), each of which has at least one high-frequency oscillator (HFO-Tn, HFO-Rm) and at least one pulse generator (PG-Tn, PG-Rm). The pulse generators (PG-Tn, PG-Rm) can be supplied with clock signals (TS, RS) from signal generators, the clock signals (TS, RS) being transmitted via a common data bus (B) to the transmit unit (Tn) and receive unit (Rm), so that a deterministic phase relationship can be generated for the high-frequency signals from the high-frequency oscillators (HFO-Tn, HFO-Rm).

The clock signals thereby have a fixed frequency relationship, which is known from the state of the clock generator.

The pulse generator PG-Tn of the transmit unit Tn is preferably connected to the data bus B via a circuit Swn, so that activation of the transmit units can be controlled by the control unit. The data bus B can also be connected to the receive units via a circuit.

With the method for operating the above sensor arrangement two clock signals are supplied via a common data bus B to a transmit unit and receive unit respectively and the signal is emitted by a transmit unit to an object and the signal obtained from the data bus B and passed through the receive unit Rm is mixed with the receive signal reflected by the object O to generate an measurement signal that can be evaluated therefrom, calibration of a measurement signal being carried out on a distance axis by determining the zero point of the clock signals on the common data bus, thereby allowing a comparison of the phases of two clock signals via the data bus.

Distance axis refers to the axis that plots the pattern of the measurement curve of a distance measurement against time.

The cost advantage in particular results in that the aperture elements of the device do not have to have a high-frequency connection. The high-frequency oscillators of the transmit and receive units respectively therefore no longer have to be connected to each other.

DETAILED DESCRIPTION OF THE INVENTION

Figure 1:
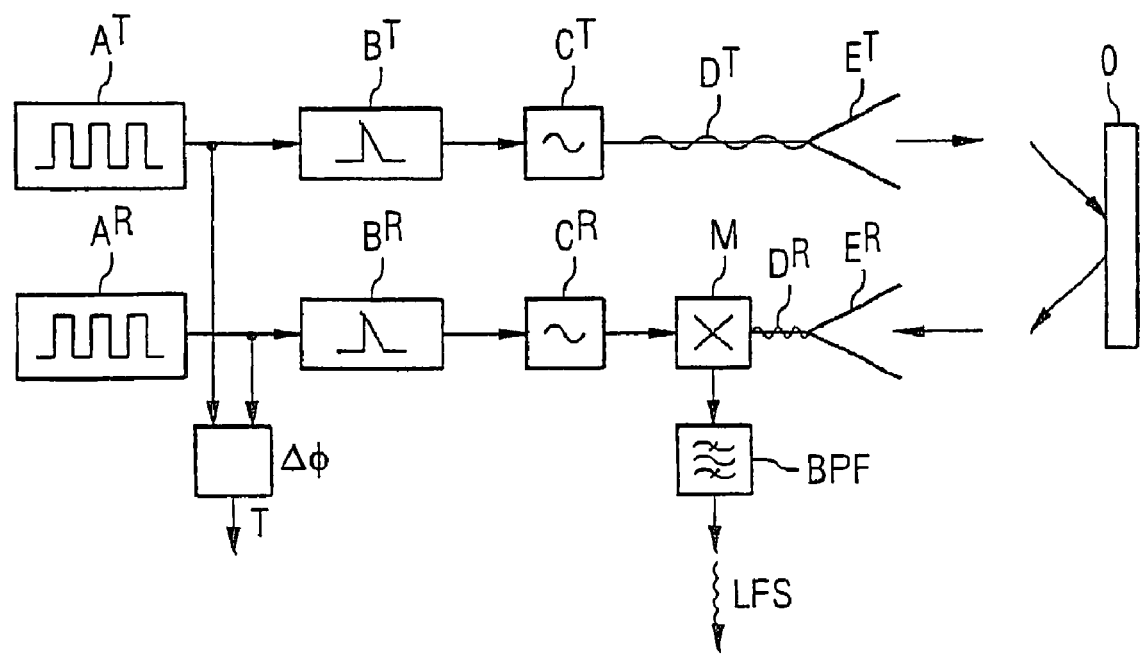
FIG. 1 shows a known embodiment of a pulse radar operating according to the prior art.
Figure 2:
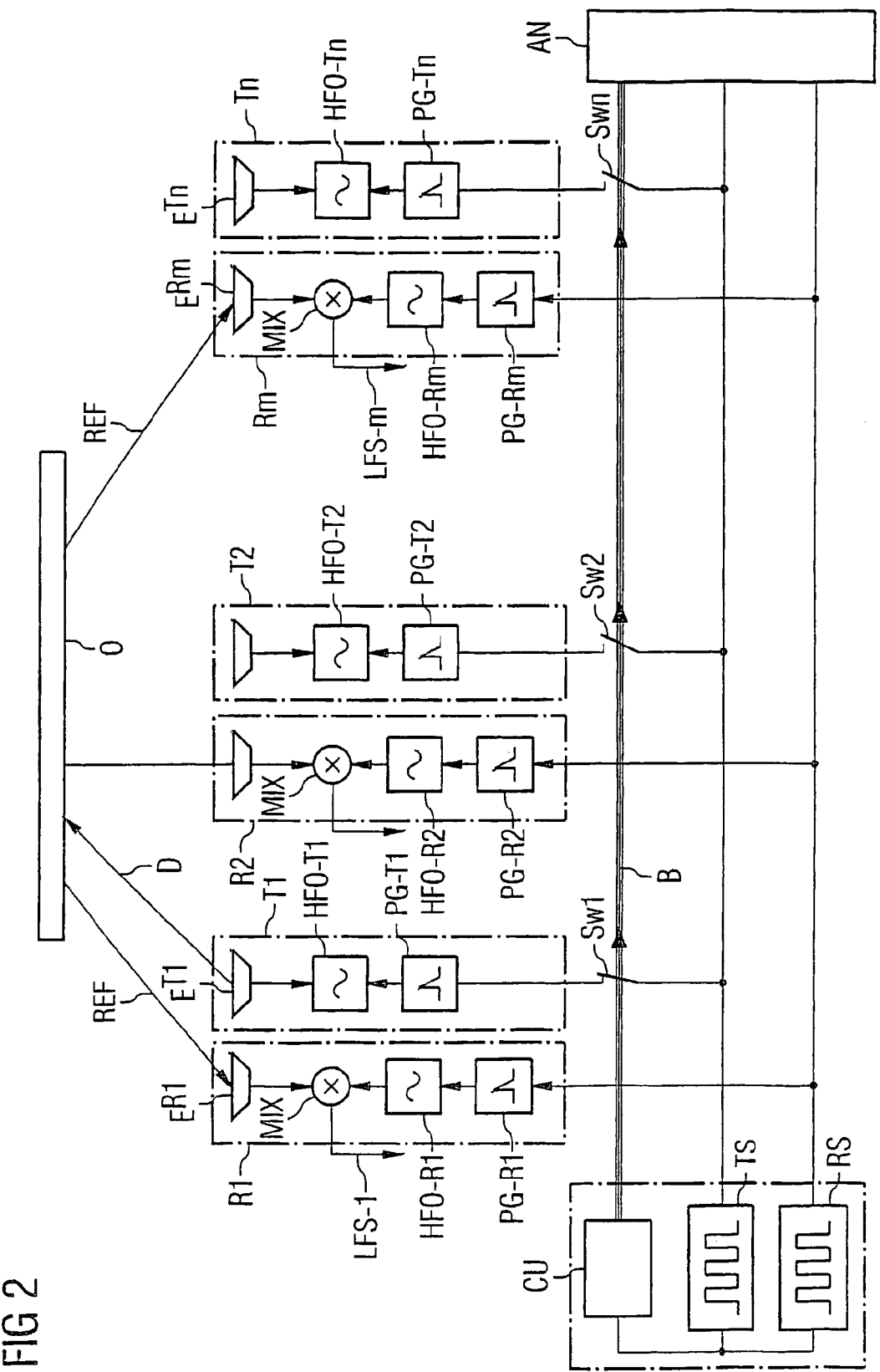
FIG. 2 shows a multistatic arrangement according to the invention.

The multistatic arrangement according to FIG. 2 comprises n and m receive and transmit units (R1, T1 to Rm, Tn respectively), also referred to as receive or send branches. A central element of this structure is the data bus B, on which the signals $A^T$ and $A^R$ are transmitted according to FIG. 1. All n and m transmit and receive branches are therefore supplied with the clock signals RS and TS via this data bus according to FIG. 2. With multiplexer circuits Sw to Swn one of the n transmit branches T1 to Tn respectively can be selected as the currently active transmitter via a control unit CU. All m receive branches can thereby receive in parallel.

It is in particular preferable for the multistatic sensor arrangement to have n transmit units Tn and m receive units Rm, n and m respectively being whole numbers greater than or equal to 1 and the units having at least one high-frequency oscillator (HFO-Tn, HFO-Rm), at least one pulse generator (PG-Tn, PG-Rm), and at least one antenna ($E^{Tn}$, $E^{Rm}$)

and the transmit unit Tn being such that it can be supplied with a clock signal generated by a first clock source TS and the receive unit Rm having a mixer MIX and being such that it can be supplied with a clock signal generated from a second clock source RS and a signal received by a receive antenna $E^{Rm}$ and both units (Tn, Rm) being connected to a control unit CU. The pulse generators (PG-Tn, PG-Rm) are thereby connected to a common data bus B, so that the transmit and receive units can also be supplied with respective clock signals via the data bus B. The common clock signals via the data bus B allow a deterministic phase relationship of the high-frequency signals from the high-frequency oscillators (HFO-Tn, HFO-Rm) of the units to be achieved.

An advantageous module concept is now presented below, with which any bistatic and multistatic pulse radar sensors can be provided in a particularly low-cost manner. A chip set comprises 2 elementary units, a transmit unit Tn and a receive unit Rm. The units comprise the following components or functions:

A transmit unit Tn comprises: a high-frequency oscillator HFO-Tn, a control pulse oscillator PG-Tn and in some instances a filter HF-FLT (not shown) in front of the antenna output $E^{Tn}$, which ensures that the transmitted signal complies with the license provisions to be applied (e.g. FCC 15.3 in the US), and in some instances an integrated ceramic antenna $E^{Tn}$.

The receive unit comprises: a high-frequency oscillator HFO-Rm, a control pulse oscillator PG-Rm, a mixer MIX and in some instances a low-noise amplifier, a spacer element, and in some instances a bandpass filter (not shown), which is connected immediately downstream from the mixer, and in some instances a filter HF-FLT behind the antenna input $E^{Rm}$, which suppresses signals that are not of interest or interfere, and in some instances an integrated ceramic antenna $E^{Rm}$.

The clock sources TS and RS for the receive and transmit units are thereby preferably controlled by a common control unit CU.

The transmit and receive signals from the respective units can of course be coded.

The method for a complete measurement is implemented such that a transmit unit T1 is first selected by a control unit CU as the active transmit branch or is released by a multiplexer circuit Sw via the data bus B. This transmitter generates transmit signals $D^T$ as shown in FIG. 1. These signals are for example reflected off an object O and received in parallel by all the m receive branches R1 to Rm with the sequential sampling system described in the introduction. The same measurement procedure is then repeated for all the other n transmit branches. If for example all the transmit and receive antennae $E^{Tn}$ and $E^{Rm}$ are in different positions, n*m non-reciprocal measurement paths result with n transmit and receive branches, in other words significantly more than with the operation of n or m conventional monostatic or bistatic radar sensors, with which only n or m measurement paths would result. If a common antenna E is used in each instance for a transmit and receive branch, the cumulative sum of 1 to n (i.e. n+(n−1)+(n−2)+ . . . +1) non-reciprocal measurement paths still results. The number of transmit and receive branches can thereby also be different, i.e. n is not the same as m.

Crucial to the scope of the obtainable measurement information however is the total number of n transmit branches+ receive branches. The figures m and n are thereby any whole number greater than or equal to 1. The measurement paths obtained can be used to reconstruct a two-dimensional or three-dimensional object scenario arithmetically, e.g. using known triangulation methods or holography or tomography algorithms and the distance from the object can be calculated.

For optimum operation of the sensor arrangement as a whole and to achieve a precise measurement method, a zero point is preferably determined when measuring the distance. The zero point is the time when the edges of the signals from HFO-Tn of a transmit branch Tn and HFO-Rm of a receive branch Rm are exactly in phase with each other. Edge here refers for example to a definable number of periods of a signal before the end of the signal.

It is advantageous if the phase comparison between the signals from TS and RS takes place at a point along the data bus B, as the signals here are phase-displaced. The offsets can be compensated for arithmetically afterwards. The phase comparison to detect the zero point can take place with standard phase comparators, as shown with $\Delta\Phi$ in FIG. 1, e.g. using a flip-flop, the length of the cable of the data bus and its dead time being part of the knowledge base for the measurement method. An evaluation unit for comparing the phases would ideally be connected directly to the data bus B or be part of the control unit CU.

The zero point can also be defined incorrectly by displacement of the clock edges from TS and RS, caused by temperature and ageing-related errors in the signal lines. It is therefore particularly preferable, when selecting the type of line for the data bus, for the edges of the trigger signals from TS and RS to be kept as uniform as possible over the entire data bus, which is also relatively simple to achieve due to the low clock frequencies (typically 100 kHz to 10 MHz). In contrast, synchronization of trigger edges at higher frequencies is problematic, as phase displacement of high-frequency signals is significantly amplified by only a very small difference in the start time of the signals or by a geometrical change to the data bus. A lower clock frequency is also advantageous. The data bus B therefore ideally terminates with an interface network AN. Such interface networks, with resistance values of approximately 50 Ohm, are known from the prior art.

In order to achieve greater accuracy of the measurement method, a clock signal from TS or RS is for example transmitted there and back via the data bus B or at least over paths of different lengths. Comparison with the original clock signal provides a correction measure or a value for calibrating the measurement method. During each calibration a standard measurement process should be carried out, i.e. the circuits to the transmit units are closed. The clock signals could thereby also be supplied at both sides or ends of the data bus system. In this case two immediately consecutive distance measurements respectively are taken, the clocks being supplied at one side of the data bus during the first measurement and at the other side of the data bus during the second measurement. This gives two almost identical echo profiles in the data bus, which are however displaced in respect of each other by a characteristic offset. The degree of this displacement and the corresponding correction value can be defined directly by the position of characteristic maxima or even by correlation of the two profiles of the measurement curves of the distance measurement. Any other clock supply systems can essentially also be used, for example such that every transmit and receive unit is equipped with its own clock sources, which then optionally supply the data bus with the clock rate.

A further option for determining the zero point involves evaluating the signal, which results due to direct cross-transmission (i.e. not via a reflection but directly from the transmitter to the receiver). Compared with the reflected signals, this signal is highly pronounced and therefore easy to identify. To amplify this pronounced nature, the antennae $E^T$ and $E^R$ can be designed or oriented such that a pronounced crosstransmission can be achieved. Alternatively line structures can be set up between the transmit and receive branches, which support cross-propagation. The signal of direct crosstalk between transmitter and receiver can be used easily and directly to calibrate the required zero point.

Figure 3:
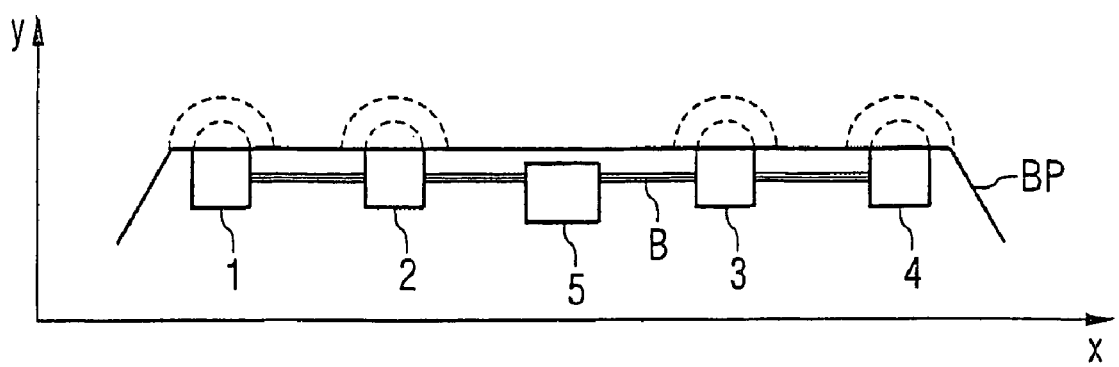
FIG. 3 shows the use of the arrangements proposed in FIG. 2 in a motor vehicle for a parking aid function and FIG. 4 shows a structural diagram of the receive unit used in the proposed arrangements.

FIG. 3 shows the inventive arrangement in the form of vehicle parking radar. Four radar sensors 1 to 4 are fixed in the fender of the vehicle BP. The common trigger, control and evaluation unit 5 supplies the data bus B, to which the radar sensors are coupled, with signals. The antennae of the radar sensors are designed such (see FIG. 2) that in addition to the principal emission direction y perpendicular to the fender, signal energy is also emitted in the transverse direction x, in order to be able to determine the zero point as mentioned above by cross-transmission. As already demonstrated above, it is advantageous for the transmit and receive units to be spatially separated, in particular in respect of the accuracy of the measurement method, in each radar sensor 1 to 4.

The more precise structure of the transmit or receive units is as follows:

High-frequency modules are generally constructed on printed circuit boards made of organic materials, e.g. Teflon or epoxy-based materials. It is generally advantageous if the high-frequency structural elements can be produced as the smallest possible units. The link between wavelength and structural size with these materials means that the preferred small size is difficult to achieve. Circuits on thin-layer ceramics are one alternative to such devices but their production is cost-intensive.

The radar modules or components of the radar modules are therefore deployed particularly advantageously as LTCC (Low Temperature Cofired Ceramic) modules. LTCC-based high-frequency structures can be produced in compact form due on the one hand to the relatively high dielectric constant and on the other hand due to the use of multilayer technology. LTCC modules are economical to produce and are also compatible with mass production.

Figure 4:
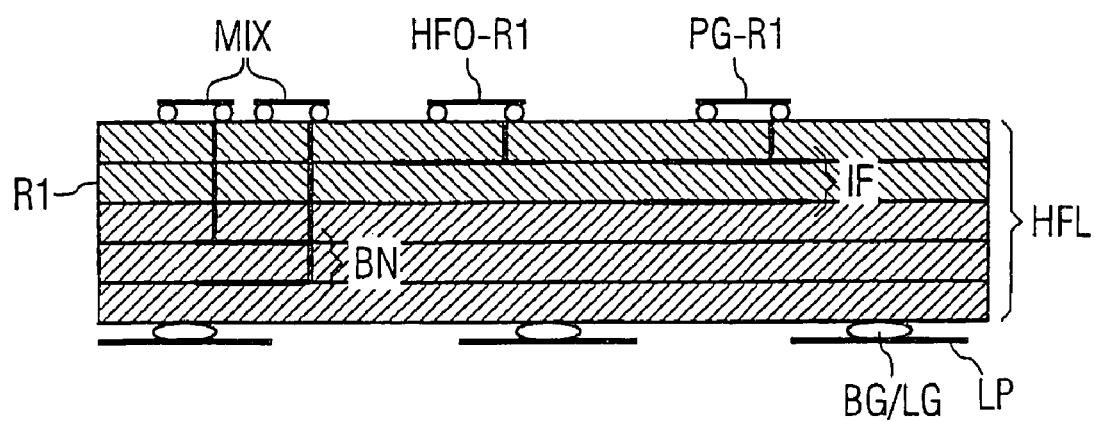

A preferred radar sub-module, produced here as a receive unit, is shown as an LTCC-HF module in FIG. 4. Integrated on the LTCC module R1 are for example a high-frequency oscillator HFO-R1, a control pulse oscillator PG-R1 to trigger the high-frequency oscillator and a mixer MIX.

Apart from the connection for an antenna $E^{R1}$, only digital or comparatively low-frequency signals are output from the LTCC module R1 (see also FIG. 2 LFS-1 to LFS-m), so the module R1 can be integrated easily and economically into the rest of the circuit. If the antenna E is not integrated into the ceramic therefore, it is very advantageous to construct the module such that it can be fitted directly onto the supply point of a patch or slot antenna $E^{R1}$. A patch antenna can then be constructed for example as a two-layer printed circuit board, the front of the printed circuit board holding the antenna structure and the rear the LTCC module, this side also having the necessary supply lines and earth surfaces. As LTCC modules are very small, it is also possible to fit an LTCC module on the front of the antenna directly on the antenna supply point and in some instances to embed it in a protective or adaptor layer, the directional diagram of the antenna not being significantly disrupted here.

A preferred structure of an LTCC radar module with the elements described above is also shown in FIG. 4. The HF circuit R1 thereby comprises a plurality of layers or HF layers HFL. Components are fitted on top of the LTCC substrate, which should not be integrated in the inside layers, e.g. semiconductor elements, a mixer MIX, a high-frequency oscillator HFO-R1 or a pulse generator PG-R1. SMT assembly or flip chip assembly, both known per se, are particularly suitable assembly techniques. The LTCC module itself can be mounted using so-called ball-grid or land-grid technology BG/LG on a standard printed circuit board LP. Integration of a bias network BN and filter IF is preferred.

BIBLIOGRAPHY

[1] U.S. Pat. No. 3,117,317
[2] U.S. Pat. No. 4,132,991
[3] U.S. Pat. No. 4,521,778
[4] "An Ultrasonic Sensor System for Location Gauging and Recognition of Small Workpieces" by Vossiek, M; Ermert, H; Sensor 95.7 "Internat. Fachmesse mit Kongress für Sensoren, Messaufnehmer u. Systeme 1995" (International Fair and Congress for Sensors, Measuring Sensors and Systems 1995).

The invention claimed is

1. A multistatic radar arrangement for measuring distance from an object, comprising:
    a transmit unit, said transmit unit having a first radar-frequency oscillator and a transmit pulse generator;
    a plurality of receive units, said receive units each having a second radar-frequency oscillator and a receive pulse generator; and
    a data bus connected to said transmit unit and each of said receive units,
    wherein the transmit and receive pulse generators are supplied with respective clock signals from clock signal generators, the clock signals being transmitted via the data bus to a corresponding transmit unit and a corresponding receive unit, so that a deterministic phase relationship is generated for frequency signals from the first and second oscillators.

2. The radar arrangement according to claim 1, wherein each of the transmit units and the receive units have an antenna.

3. The radar arrangement according to claim 2, wherein each receive unit has a mixer.

4. The radar arrangement according to claim 1, wherein each receive unit has a mixer.

5. The radar arrangement according to claim 1, wherein the clock signal generators are arranged at different positions in the data bus.

6. The radar arrangement according to claim 5, wherein the clock signal generators are arranged at the ends of the data bus.

7. The radar arrangement according to claim 1, wherein the transmit unit and receive units are based on Low Temperature Cofired Ceramic (LTCC)

8. The radar arrangement according to claim 1, wherein at least one of a low-noise amplifier, a bandpass filter, a radar filter filtering above 3 MHz, and a sample hold element is connected to each receive unit.

9. A method for operating a radar arrangement, comprising:
    supplying clock signals from clock signal sources via a data bus to a transmit unit and to a plurality of receive units;
    emitting a signal from the transmit unit to an object;
    at each receive unit, mixing the signal reflected from the object with the clock signals in order to generate a measurement signal;
    calibrating the clock signals carried out on the data bus based on a determination of a zero point of the clock signal, and
    comparing the phases of two of said clock signals via the data bus.

10. The method according to claim 9, further comprising carrying out a phase comparison based on a sample at one point of the data bus to determine the zero point.

11. The method according to claim 10, wherein the zero point is achieved by a phase comparison between two clock signals, which are supplied at two ends of the data bus.

12. The method according to claim 9, wherein the zero point is achieved by a phase comparison between two clock signals, which were supplied at two ends of the data bus.

13. The method according to claim 9, wherein the calibration of the clock signals is achieved by a clock signal being transmitted over different lengths in the data bus and providing a correction measure based on a comparison with an original clock signal.

14. The method according to claim 9, wherein a phase comparison takes place using a FLIP FLOP.

15. The method according to claim 9, wherein the transmit unit is selectively activated from among a plurality of transmit units using a control unit via a multiplexer circuit.

16. The method according to claim 9, wherein all receive units are activated so that the signal reflected from the object is received in parallel.

* * * * *

UNITED STATES PATENT AND TRADEMARK OFFICE
CERTIFICATE OF CORRECTION

PATENT NO. : 7,589,665 B2 Page 1 of 1
APPLICATION NO. : 10/531983
DATED : September 15, 2009
INVENTOR(S) : Heide et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-first Day of September, 2010

David J. Kappos
*Director of the United States Patent and Trademark Office*